Patented Aug. 20, 1929.

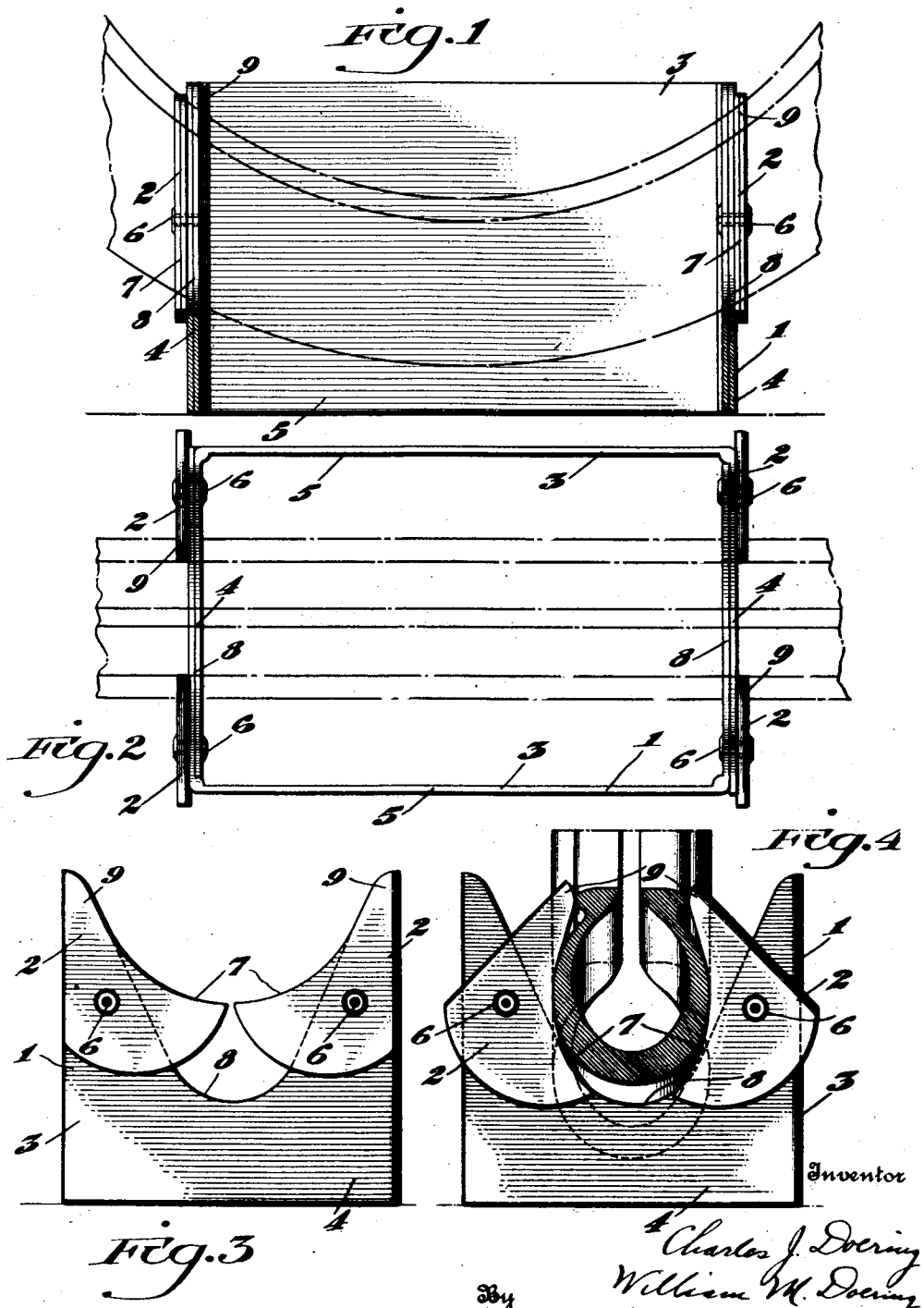

1,725,181

UNITED STATES PATENT OFFICE.

CHARLES J. DOERING AND WILLIAM M. DOERING, OF CINCINNATI, OHIO.

TIRE STAND.

Application filed December 29, 1926. Serial No. 157,791.

This invention relates to display and advertising stands for use in displaying tire casings, and is particularly directed to a stand in the nature of a rack wherein the weight of the tire casing causes the rack to sustain the tire in an upright position.

An object of this invention is to provide a tire stand comprising pairs of tire engaging clamping jaws pivoted to a stationary frame at opposite ends thereof, the jaws of such curvature and mounted in a relation that the weight of the tire cradled therein swings the jaws into engagement with the tire and clamps the tire in upright position in the stand.

Another object is to provide a stand of this nature in which the pairs of jaws have their inner edges so formed as to engage with equal force the sides and beads of the tire casings, giving a greater jaw grip due to increased jaw contact, and a propping action due to jaw extensions engaging the tire beads thereby preventing tire rotation in the jaw grip.

Still another object is to provide a tire stand fabricated of card board which is composed of a minimum of parts and in which the jaws may be stamped out in duplicate from cardboard stock as well as the parts making up the frame and which may be folded as an assembled product into compact form when not in use.

Still another object is to provide a tire stand of this nature fabricated in such manner as to give double ply thickness to the end walls thereof and to form the jaws therefor of double ply thickness by overlapping the material and to furthermore maintain all stand parts held in assembly by the jaw pivots.

Other objects and certain advantages will appear in the description of the accompanying drawings, in which:

Figure 1 is a sectional view taken centrally and longitudinally of the stand and illustrating in dot and dash lines the position of a tire therein.

Figure 2 is a top plan view further illustrating the stand.

Figure 3 is an end view showing the jaws in position to receive a tire casing.

Figure 4 is an end view taken the same as Figure 2 but showing the jaws clamped about the tire and sustaining it in upright position.

Referring to the drawings, the body of the stand is indicated at 1 and the clamping jaws at 2. The body is made up in duplicate U-shaped pieces 3—3 so as to give double thickness to the end portions 4—4 of the body 1 when the pieces are placed together and the ends overlapped. The flat side surfaces 5—5 of the body serve for advertising space. The double thickness end portions have the jaws 2 secured thereon in pairs, the jaws being formed of material overlapped giving a double ply thickness thereto. The jaws are pivoted on fasteners 6, the fasteners extending through and serving also to maintain the body portions 3—3 in assembly. The double ply construction of end walls and jaws gives the proper strength to the stand at the points of strain.

The tire engaging inner edges 7 of the jaws are curved to substantially fit the tire casing outline when in gripping position and the ends of the body are cut out as at 8 to provide clearance for the tire casing seated within the pairs of oppositely mounted jaws. The particular shape of the tire engaging edge of the jaws is such that the tire is engaged over a considerable portion at each side and also at the bead portions by the extensions 9 of the jaws. The clamping action of the jaws is caused by the weight of the tire on the jaw edges, swinging the jaws inward and against the tire. The heavier the particular tire the more positive the jaw grip thereof. This provision of jaw contact, not only on the tire sides but on the beads, gives a greater jaw grip due to increased contact and the action of the jaw extensions on the tire beads is in the nature of a propping of the tire casing in cooperation with the gripping action on the sides thereof. This propping through engagement with the beads prevents turning of the tire in the jaw grip and the tire is maintained in a set upright position.

The herein described stand can be fabricated of other substances as of metal, wood, etc., the materials used varying.

Having described our invention, we claim:

1. A stand of the class described for sustaining a tire casing in upright position, comprising, a rectangular frame, pairs of jaws pivotally mounted at each end of said frame, the pivots of each pair of jaws, mounted in the frame end walls, having relatively fixed centers, said jaws, comprising, body portions, and upper prop extensions, whereby the body portion inner edges clamp against the tire casing walls and the extensions engage the tire casing beads.

2. A tire stand, comprising, a rectangular frame open at the top and bottom, a pair of jaws pivotally mounted on each end panel of the frame, the respective pivot elements of each pair of jaws mounted in fixed spaced relation in said end panels of the frame, the jaws each having a concave inner surface for engaging a side of the tire and an upper extension for engaging the bead of the tire, and the end panels of said frame cut away as a clearance for a tire secured in the jaws of the stand.

In witness whereof, we hereunto subscribe our names.

CHARLES J. DOERING.
WILLIAM M. DOERING.